United States Patent

Brant

[15] 3,645,347
[45] Feb. 29, 1972

[54] GUIDE MEANS FOR SKIS

[72] Inventor: Williard L. Brant, 12044 78th S., Seattle, Wash. 98186

[22] Filed: May 26, 1971

[21] Appl. No.: 146,862

[52] U.S. Cl. ................................................180/5, 280/28
[51] Int. Cl. .........................................................B62b 17/02
[58] Field of Search..............................280/28, 12 R; 180/5

[56] References Cited

UNITED STATES PATENTS

| | | | |
|---|---|---|---|
| 630,810 | 8/1899 | Kidder | 280/28 |
| 703,510 | 7/1902 | Williams | 280/28 |
| 1,054,673 | 3/1913 | Charles | 280/28 |
| 2,741,487 | 4/1956 | Carefoot | 280/28 |

Primary Examiner—Benjamin Hersh
Assistant Examiner—Robert R. Song
Attorney—Christensen & Sanborn

[57] ABSTRACT

An adjustable guiding and steering means for a ski which may be utilized to enhance the controllability of skis on difficult terrain is described. The guide means comprises a guide member having a portion thereof positioned beneath the surface of the skis and resiliently forced into contact with the snow or ice. The degree of penetration into the snow or ice is governed by the amount of resilient force applied to a downwardly bowed segment of the guide means. The guide means is useful in aiding both human skiers and snowmobiles to negotiate corners and maintain balance on terrain such as crusted snow or ice.

9 Claims, 7 Drawing Figures

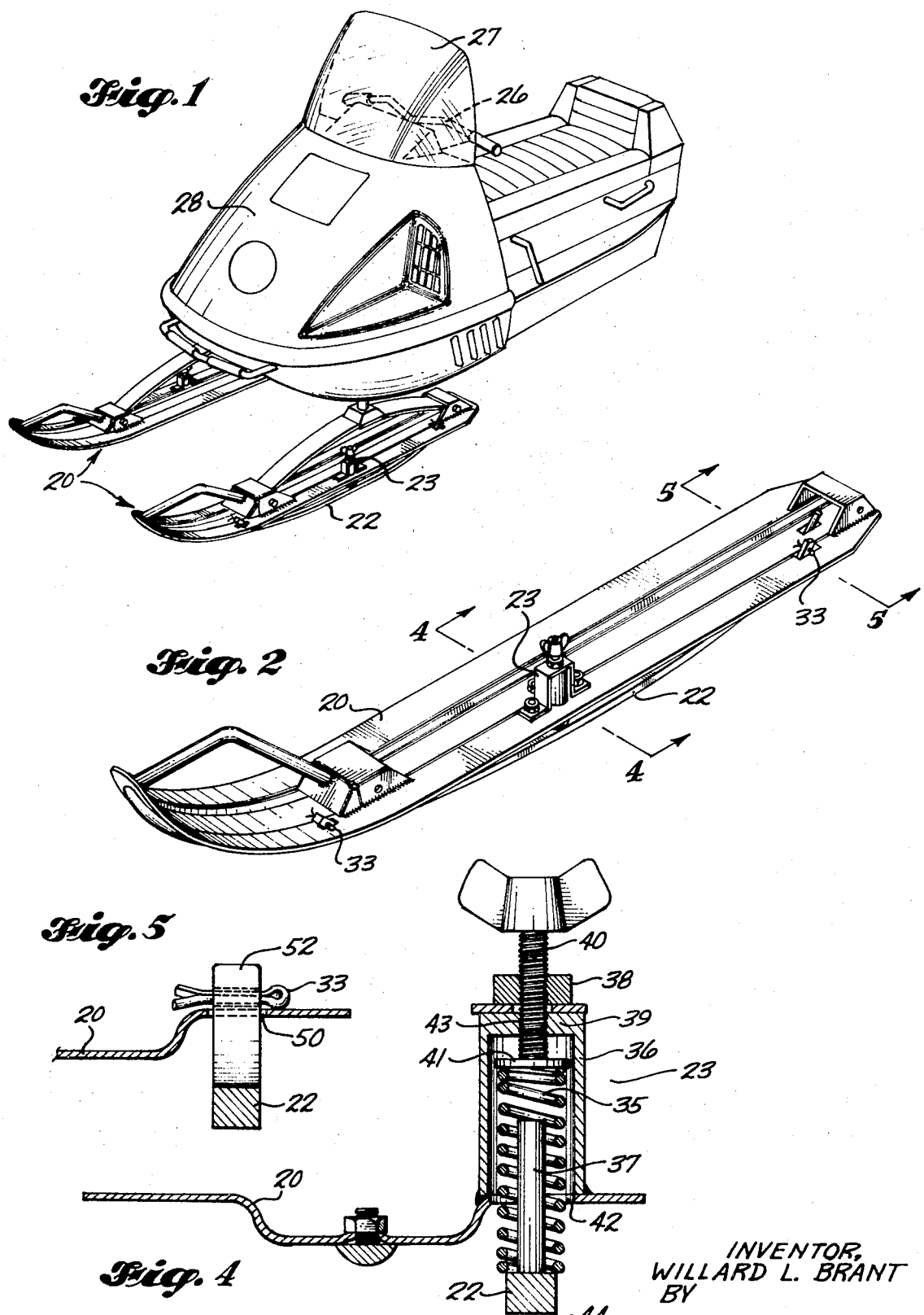

PATENTED FEB 29 1972
3,645,347
SHEET 2 OF 2
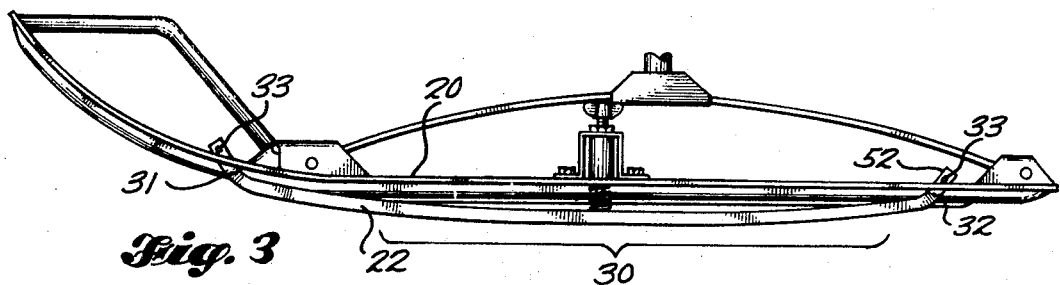
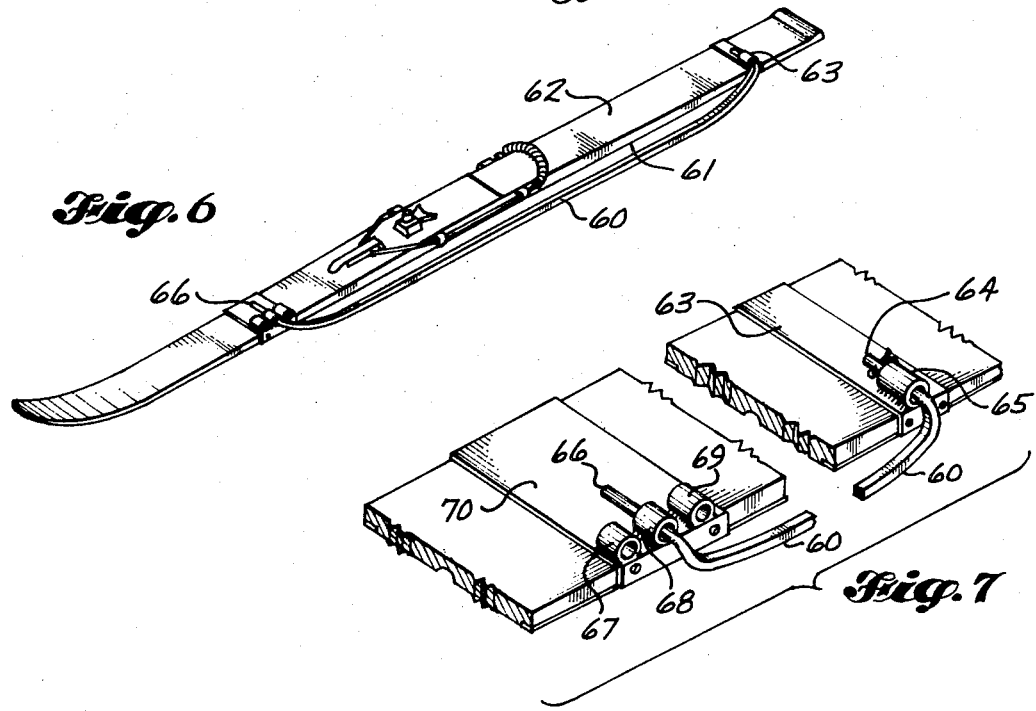
INVENTOR,
WILLARD L. BRANT
BY
Christensen & Sanborn
ATTORNEYS

GUIDE MEANS FOR SKIS

BACKGROUND OF THE INVENTION

This invention relates to a guiding mechanism for snow skis, especially those attached to snowmobiles, and to a means for guiding and controlling skis of all sorts.

This invention further relates to a resiliently mounted guide mechanism for use with skis which enhances the ability of the skis to engage and maneuver in crusted snow, hard-packed snow and on ice.

Travel across snow and ice covered terrain until recently was limited to certain types of relatively expensive track-type vehicles, and to individual travel on skis or snowshoes. Recently, snowmobiles have become increasingly popular for such travel, providing a relatively rapid form of transportation across snow covered and ice covered areas. While many of the problems of snow and ice travel have been answered by the availability and popularity of snowmobiles, the safety and handling characteristics of snowmobiles are frequently less than satisfactory and occasionally quite dangerous to the riders. Snowmobiles perform adequately at low speeds in soft snow but usage at high speeds and on hard-crusted snow or ice is fraught with danger due to inability of the snowmobiles heretofore to engage the snow or ice properly to execute a turn or to traverse a side hill without slippage. This shortcoming has been recognized by the snowmobile manufacturers; however, attempts to alleviate the problem have heretofore not been fully satisfactory. Manufacturers have attached small wheels to the snowmobile skis in an attempt to obtain better cornering performance and have tilted the ski surface in response to motion of the steering apparatus. Other attempts have been made to solve the problem, all of which have been largely unsuccessful. The need for means to improve engagement of the ski surface with the terrain has heretofore been unanswered.

The need for enhanced controllability and stability for snowmobiles has become even more important recently due to the phenomenal increase in sales and acceptance of the snowmobile as a recreational vehicle. Many of the users of snowmobiles for recreational purposes do not have their coordination and skills in handling the snowmobiles developed to the point that safety in operation of the snowmobile is achieved. Therefore, any improvement in the ability of the snowmobile to grip the snow or ice surface and thereby enhance its ability to turn and maneuver is of a great advantage in avoiding accidents and injury resulting from snowmobile usage.

The skis used in recreational alpine-type or cross-country skiing similarly suffer from the poor gripping tendencies, particularly when used by skiers of novice or beginning level of ability.

Accordingly, it is an object of this invention to provide a guide means assembly for enhancing the maneuverability of skis both for use with snowmobiles and for human usage.

It is a further object of this invention to provide an adjustable guide means variably engaging the surface of ice or snow upon which a ski is traversing to permit a greater degree of maneuverability with the skis.

It is a still further object of this invention to provide guide means for skis which resiliently and slidably engage snow or ice to improve the gripping tendencies of skis by decreasing or eliminating side slippage.

SUMMARY OF THE INVENTION

Skis for snowmobiles and for recreational alpine and cross-country skiing activities are equipped with a resiliently mounted guide means comprising an elongated, downwardly bowed snow and ice engaging rod adapted to be positioned with the bowed portion thereof extending below the weight-bearing surface of the skis to provide additional gripping and engagement with the snow or ice surface. The resilient bowed member may be provided with means to urge the bowed portion thereof downwardly into the snow or ice or may be adjusted by altering the tension or compression placed upon the length of the guide means.

The guide means is preferably placed longitudinally along the outer edge of the skis to enhance its ability to dig into the snow or ice in cornering. The snow and ice engaging portion of the guide means may be sharpened to improve its ability to grip ice or pierce the top layer of crusted or packed snow. The degree of downward force resiliently applied to the guide member may be varied by adjustment of the resilient spring tension applied to the guide means to force it into sliding engagement with the snow surface but not carry the full weight of the snowmobile. In the alpine or cross-country skis application, a bottom or side-mounted rail-type guide means resiliently engaging the snow surface is used which may be adjusted for various snow conditions by varying the downward bow induced into the resilient guide member by lengthening or shortening the chord length of the bow by relative translation of the position of attachment of one or both ends thereof.

These and other objects, attributes, advantages and features of this invention may be more clearly understood through a detailed analysis of the following description of preferred embodiments of this invention with reference to the attached drawings depicting the preferred embodiments. The preferred embodiments are presented here by way of example and for explanation only and are not to be considered as limiting the invention.

IN THE DRAWINGS

FIG. 1 shows the perspective view of a typical snowmobile having the devices of this invention attached to the skis of the snowmobile.

FIG. 2 shows an enlarged perspective view of the ski of the snowmobile shown in FIG. 1 showing the guide mechanism of this invention attached thereto.

FIG. 3 shows an elevation view of the ski shown in FIG. 2.

FIG. 4 is a cross-sectional view of the adjustment means for the ski shown in FIG. 2 taken along line 4—4 of FIG. 2.

FIG. 5 is a cross-sectional view of a portion of the ski shown in FIG. 2 taken along lines 5—5 of FIG. 2.

FIG. 6 shows an alpine-type ski having one embodiment of the device of this invention attached thereto.

FIG. 7 shows an enlarged view of the device shown in FIG. 6 depicting the mounting mechanism and adjustment means for use of the device of this invention in conjunction with an alpine-type ski.

Referring particularly to the drawings wherein like FIGS. indicate like parts, there is seen in FIG. 1 a snowmobile having a pair of skis, shown generally at 20, equipped with the guiding means of this invention including a guide rail means 22 and adjustment means 23. The snowmobile apparatus shown in FIG. 1 has a passenger seat 25, steering mechanism 26, windshield 27, cowling 28, and a drive mechanism (not shown) to engage the snow or cause forward motion of the snowmobile. The device of this invention is adapted to be used on the skis of any of the well-known and diverse types of snowmobiles.

In FIG. 3 the downwardly bowed portion 30 of the snow and ice engaging portion 30 of the guide means 22 is shown in detail. At each end of guide means 22 there is an upturned portion, the forward upturned portion 31 protruding upwardly through an aperture 51 in the forward part of the ski 20 and the rearward upturned portion 32 projecting upwardly through an aperture 50 in the rearward portion of the ski 20. The portion of each end of guide means 22 which protrudes above the upper surface of the ski 20 is secured at that point by a cotter pin 33 or other suitable fastener means.

At the middle of the guide rail 22 is positioned an adjustment means shown generally at 23. A cross-sectional view of the details of the adjustment means is shown in FIG. 4. A housing 36 is attached to the top surface of ski 20 over aperture 42. An upstanding member 37 is attached to the guide rail means 22 and protrudes upwardly through aperture 42 into the interior of housing 36. The compression spring 35 surrounds a portion of the upstanding member 37 and operatively engages the guide rail means 22 to urge it downwardly. The upper end of spring 35 bears upon washer 41 which in turn is raised or lowered in position by movement of the threaded positioning member 40. The top portion 39 of casing 36 has a threaded aperture 43 adapted to engage the threaded positioning member 40. Locknut 38 is used to secure the threaded member 40 in place and prevent rotation thereof after adjustment to the proper vertical location to impose the desired compression upon spring 35.

In FIG. 5, the details of the mounting mechanism for the rearward portion of the guide means 22 is shown in a partial cross-sectional view. An aperture 50 is shown opening through the ski 20 to permit passage thereto of the end portion 52 of the guide means 22. The cotter pin 33 shown in its operative position prevents removal of the guide rod means 22 from the aperture 50. A similar mounting mechanism is utilized at the front mounting position for the guide means 22.

In FIG. 6 an alpine-type ski having one embodiment of the device of this invention attached thereto to aid the skier in learning to ski and in traversing difficult terrain is shown. This embodiment of the invention aids the skier in keeping his skis parallel while learning the art of alpine skiing. The downwardly bowed guide rod 60 is shown positioned along side the edge 61 of ski 62. A rear mounting means 63 is shown in FIGS. 6 and 7 in which the terminal end 64 has been passed through an opening in the upstanding portion 65 of the rear mounting means 63. The amount of downward bow in the guide means 60 is controlled by the location of the forward end 66 of the guide means 60. The forward end 66 may be placed in any one of a plurality of receptacles 67, 68 and 69 which are firmly attached to the front mounting means 70, and which provide the means to vary the chord length of the bowed section of guide means 60.

In the operation of either of the illustrated preferred embodiments of this invention, the snow or ice conditions are first ascertained and a sufficient amount of downward bow in the guide means established by adjustment of the mounting apparatus. In the snowmobile embodiment the tension of spring 35 is adjusted by raising or lowering the threaded member 40 and locking the locknut 38 to restrained rotation of member 40 when it is adjusted to the proper height. Sufficient downwardly directed force should be placed on the guide means 22 so that it will bite into the surface of the ice or snow material being traversed to improve the guiding capability of the device.

The ski is then placed upon the surface to be traversed and the amount of control obtained through the use of the guide means 22 or 60 ascertained. If more or less engagement with the snow or ice is desired suitable alterations to the adjustment means may be undertaken. As snow or ice conditions change different settings of the adjustment mechanism may be desirable to provide the control necessary to operate the skis.

In the embodiment of this invention intended for use with snowmobiles, one guide means 22 would be utilized with each ski and mounted on or near the outer edge of each of the skis to provide maximum control and stability. As the guide means are used, the outer edge 44 shown in FIG. 4 will tend to lose its sharp square corner due to wearing away of the edge material. When this happens the guide means 22 may either be sharpened as by filing and grinding or it may be exchanged with the guide means used on the other ski so that edge 45 will assume the outer position and provide a sharp edge for cornering and especially for engagement with ice. Alternately, the guide means 22 may be so constructed that it may be turned 180° about the axis of upstanding member 37 so that a new sharp edge will be exposed to use. A hollow ground bottom surface may be provided to enhance the life of the guide means and to improve its gripping tendencies.

This invention thus provides for an elongated guide means for engaging snow or ice which has at least a portion thereof bowed downwardly to a position below the weight-bearing surface of a ski and oriented substantially parallel to the major axis of the ski and thus to the usual direction of travel thereof.

To respond to variations in conditions provision is made in the preferred embodiments for adjustment of the amount of force urging the bowed portion of the guide means downwardly into engagement with the snow or ice. The guide means of this invention is used to aid in the cornering of a snowmobile by providing a positive gripping means to force the snowmobile into a turn with a minimum of sideslip and in maneuvering alpine-type skis by aiding the skier to keep his skis parallel.

Any material may be used for the guide means of this invention which has sufficiently high strength, resilience and wear characteristics to serve the intended purpose. Spring-type steel or stainless steel preferably may be used for the guide rod 22. Of course other metals and possibly wood or plastics could be substituted.

It will be appreciated by those skilled in the art that the ski guide means achieving the above-enumerated objectives and other objectives related thereto may be embodied in variant forms within the framework of the inventive concepts enumerated herein. However, the illustrated embodiments and variations thereof within the abilities of those skilled in the art art considered to exemplify the inventor's preferred concepts for meeting the objectives stated herein. Various changes in detail and arrangement of the elements of this invention can be made by one skilled in the art without departing from either the scope or spirit of the invention.

I claim as my invention:

1. A guide means for a ski to provide positive engagement with terrain traversed comprising:
   an elongated, downwardly bowed guide rod means positioned substantially parallel to the major axis of said ski and to the direction of travel thereof and having at least a portion thereof exposed beneath said skis to slidably engage the terrain being traversed;
   means to slidably attach at least one end of said rod means to said skis; and
   means to vary the amount of downward bow in said rod to alter the engagement of said rod with said terrain.

2. The guide means of claim 1 wherein said guide rod means is urged downwardly intermediate the ends thereof with respect to said ski by a resilient means to force said rod means into retractable engagement with said terrain.

3. The guide means of claim 1 wherein said guide rod means has sharpened edges adapted to slidably engage the terrain traversed and urge said skis along a longitudinal path substantially parallel to the major axis of said ski.

4. A snowmobile having a pair of parallel, spaced-apart direction-controlling skis mounted at the forward end thereof each ski having a guide means adapted to enhance the controllability and maneuverability of said snowmobile by improving the engagement of said ski with said terrain, said guide means comprising an elongated rodlike member having at least a portion thereof exposed beneath said skis to slidably engage the terrain being traversed and oriented substantially parallel to the major axis thereof, said rodlike member being slidably attached at least one end thereof to said ski at the forward end thereof and having means to vary the amount of downward bow with respect to the lower surface of said ski.

5. The snowmobile of claim 4 wherein said member also engages said ski at a location toward the rear portion of said ski to maintain said rod substantially parallel to the major axis of said ski.

6. The snowmobile of claim 4 wherein said means to vary the position of said member comprises a compressible member engaging said member to variably urge said member downwardly into engagement with terrain being traversed.

7. The device of claim 1 wherein said ski is a snowmobile ski.

8. The guide means of claim 1 wherein said means to vary the downward bow of said rod comprises adjustment means varying the chord length of said rod.

9. The guide means of claim 1 wherein said rod means has a substantially rectangular cross section.

* * * * *